United States Patent
Wonner et al.

(10) Patent No.: US 6,579,964 B2
(45) Date of Patent: Jun. 17, 2003

(54) WATER-DILUTABLE ETHERIFIED MELAMINE-FORMALDEHYDE RESINS

(75) Inventors: Johann Wonner, Rodgau (DE); Frank Scholl, Bad Homburg (DE); Karin Schloettig, Maintal (DE); Guenter Woelfert, Frankfurt am Main (DE)

(73) Assignee: Solutia Germany GmbH & Co. KG, Mainz-Kastel (DE)

( * ) Notice: Subject to any disclaimer, the term of this patent is extended or adjusted under 35 U.S.C. 154(b) by 13 days.

(21) Appl. No.: 10/016,095

(22) Filed: Oct. 31, 2001

(65) Prior Publication Data

US 2002/0198355 A1 Dec. 26, 2002

(30) Foreign Application Priority Data

Jun. 12, 2001 (DE) .......................................... 101 28 420

(51) Int. Cl.⁷ ........................ C08G 12/30; C08G 12/32; C08G 12/36; C08G 12/38
(52) U.S. Cl. ........................ 528/254; 528/243; 528/248; 528/256
(58) Field of Search ................................. 528/254, 243, 528/248, 256

(56) References Cited

U.S. PATENT DOCUMENTS

| 2,928,758 A | 3/1960 | Waddle et al. ................ 117/62 |
| 3,487,048 A | 12/1969 | Deuzeman |

FOREIGN PATENT DOCUMENTS

| DE | 22 59 680 A | 7/1974 | |
| EP | 0 176 709 A1 | 4/1986 | |
| EP | 0 733 686 A2 | 9/1996 | ......... C09D/161/32 |
| GB | 1121649 | 7/1968 | ............ C08G/9/28 |
| JP | 56024415 | 3/1981 | ........... C08G/12/42 |

*Primary Examiner*—Duc Truong
(74) *Attorney, Agent, or Firm*—ProPat, L.L.C.

(57) ABSTRACT

Water-dilutable etherified melamine-formaldehyde resins obtained by reacting melamine, formaldehyde, a compound having anionic groups and an etherification alcohol in a mixing ratio of melamine:formaldehyde:compound having anionic group:etherification alcohol of 1:(1.7 to 7.0):(0.01 to 0.4):(10 to 30) in the reaction mixture, are prepared in a multistage process and are used for preparing impregnates, especially glass fiber fleece and in paper coating.

13 Claims, No Drawings

WATER-DILUTABLE ETHERIFIED MELAMINE-FORMALDEHYDE RESINS

FIELD OF THE INVENTION

This invention relates to water-dilutable etherified melamine-formaldehyde resins, their preparation and use for preparing building materials and insulation material, fleece, web or nonwovens production, paper and textile finishing and preparing foils and edgings.

BACKGROUND OF THE INVENTION

The preparation of water-soluble etherified melamine resins is common knowledge. First melamine (optionally mixed with other amino resin formers such as urea, acetoguanamine, benzoguanamine and caprinoguanamine) is methylolated by addition of formaldehyde or of compounds which release formaldehyde under the reaction conditions, and condensed, at pH 7 to 10 and 40 to 110° C. and then the etherification alcohol is added and reacted at pH 1 to 7 and 30 to 80° C. The condensation and etherification conditions depend on the properties desired of the resin, for example viscosity and water dilutability. Preferred etherification alcohols include methanol, ethanol, n-propanol, isopropanol and the isomeric butanols (n-, sec-, tert- and isobutanol), especially methanol, n-butanol and isobutanol.

The preparation of anionically modified melamine resins, i.e., cocondensates of melamine, formaldehyde, salts of amidosulfuric acid (sulfamic acid, sulfamidic acid, amidosulfonic acid), sodium sulfite or sodium bisulfite (sodium hydrogensulfite) and the like, is likewise known.

For instance, EP-A 0 176 709 (DE-A 34 30 248) describes condensates prepared by reaction of melamine, formaldehyde (M/F ratio=1:2 to 1:3.2 mol/mol), a sulfamate (0.025 to 0.045 mol of sodium sulfamate per 1 mol of formaldehyde; corresponds to 0.05 to 0.14 mol of the sulfamate per 1 mol of melamine) and a nonreducing sugar (in an amount of at least 3% of the mass of the reaction mixture) in the presence of a (thio)amide or amidine and of a $C_1$- to $C_3$-alcohol at a pH of above 8. The resultant resins are used as coatings, impregnants and binders for fiber webs. The resin solutions are said to be notable for very good stability in storage in particular. Under the reported alkaline reaction conditions—pH above 8—and the small amounts of alcohols added—below 0.35 mol of methanol per 1 mol of melamine in each of the reported examples—etherification is impossible. The water dilutability of the resins described is below 1:7 (measured as mass ratio of resin solution to demineralized (DM) water), unlimited miscibility with DM water is not achieved.

DE-A 22 59 680 claims a process for preparing melamine-urea-formaldehyde resins having a mass ratio of melamine to urea in the range from 1:9 to 9:1 which are modified with organic aminocarboxylic or aminosulfonic acids or sodium or ammonium sulfite or bisulfite and etherified with alcohols containing 1 to 3 carbon atoms. The resins are used as chlorinefast finishing agents. The amino groups of the melamine and of the urea have to be completely methylolated to this end; the condensation products should ideally no longer contain any free NH groups. The process is carried out in two stages; the first stage comprises a methylolation under alkaline catalysis and incorporation of the anionic component by cocondensation and the second stage comprises an etherification with an alcohol under acidic catalysis. The resins having such a high degree of methylolation result in products with elevated formaldehyde cleavage on drying.

U.S. Pat. No. 3,487,048 (GB 1232031) describes a one step methylolation and etherification of melamine in an acidic medium. To this end, 3 to 6 mol of formaldehyde are reacted in methanol with melamine in the presence of acids, preferably amidosulfonic acid, as a catalyst to form a methyl-etherified melamine resin directly in one step. The amidosulfonic acid added serves only as a proton donor; incorporation into the resin is not described or stipulated for the resin properties. The amount of amidosulfonic acid used in the examples is 1.3 to 1.4 mmol per 1 mol of melamine. The problems of water dilutability and storage stability are not discussed.

The cleavage of formaldehyde in the course of curing of (methanol-) etherified melamine resins can be reduced by minimizing the ratio F/M of the amounts of substance of formaldehyde and melamine in the batch. On the other hand, the lower limit of F/M is determined by the solution properties of melamine in the course of the methylolation. In the case of resins having an F/M of below 1.9 it is difficult to obtain stable resins which preserve their high water compatibility over the storage period. It is likewise possible to use non-etherified melamine resins having an F/M of below 2 which have been modified with sulfamates or sulfites or bisulfites (hydrogensulfites) to obtain unlimited water compatibility. But the stability of these resins having an undiminished high water compatibility over the storage period is limited to just a few weeks.

It is an object of the present invention to provide aqueous melamine resins combining good stability in storage and unlimited water miscibility with low formaldehyde cleavage from substrates impregnated or finished therewith.

Aqueous melamine resins are melamine resins having a mass fraction of water of not less than 5%. Melamine resins of this type are said to possess unlimited water miscibility when there is no miscibility gap in the system consisting of melamine resin and water at room temperature (20° C.). In macroscopic terms, the existence of a miscibility gap can be identified by the occurrence of opacity on gradual thinning of the pure melamine resin with water under intensive agitation. Aqueous melamine resins are said to possess good stability upon storage if there is no phase separation (opacity) for at least 6 weeks from their preparation.

SUMMARY OF THE INVENTION

Cocondensation of compounds having anionic groups into (methyl-) etherified melamine-formaldehyde resins provides novel resins having distinctly improved stability in storage coupled with unlimited water miscibility.

"Compounds having anionic groups" for the purposes of the invention are such compounds which, when melamine resins modified therewith are dissolved in water or aqueous systems, dissociate to provide melamine resins dissolved or dispersed in the water which contain anionic groups in cocondensed form.

The invention provides water-dilutable etherified melamine-formaldehyde resins obtained by reacting melamine, formaldehyde, a compound having anionic groups and an etherification alcohol where the ratio of the amounts of substance of melamine:formaldehyde:compound having anionic group:etherification alcohol in the reaction mixture is 1:(1.7 to 7.0):(0.01 to 0.4):(10 to 30), said compounds having anionic groups preferably being selected from salts of sulfamic acid (sulfamidic acid, amidosulfuric acid $H_2N$—$SO_2$—$OH$), sulfurous acid ($H_2SO_3$; $HO$—$SO$—$OH$) and pyrosulfurous acid (disulfurous acid $H_2S_2O_5$, $HO$—$SO$—$O$—$SO$—$OH$) with alkali metals or ammonium.

Complete or substantially complete reaction provides a resin containing building blocks derived from the compounds mentioned, in the stated mixing ratio. The reaction is termed substantially complete when its degree of conversion is not less than 95%, preferably not less than 97% and especially not less than 98%.

DETAILED DESCRIPTION OF THE PREFERRED EMBODIMENTS

Preference is given to using melamine as a sole amino resin former, but it is also possible to replace up to 10% of the melamine by one or more compounds selected from the group consisting of acetoguanamine, benzoguanamine and caprinoguanamine. Urea and/or thiourea should not be used at all or only in mass fractions of not more than 8%, based on the total mass of the amino resin formers. It is preferable to use not more than 7% and particularly preferably not more than 6% of (thio)urea, most preferred, this mass fraction should not exceed 5%. However, it is possible to use cyclic ureas such as ethyleneurea (2-imidazolidinone), propyleneurea (2-oxohexahydropyrimidine) or glycoluril in mass fractions of up to 10%, based on the total mass of the amino resin formers.

Useful etherification alcohols include linear or branched aliphatic alcohols having 1 to 6, preferably 1 to 4, carbon atoms, used individually or in mixture. Preference is given to using methanol, ethanol, n-propanol, isopropanol, n-butanol and isobutanol; particular preference is given to methanol.

Useful compounds having anionic groups include compounds which, under the conditions of the condensation of melamine and formaldehyde are incorporated into the resultant resins through participation in the condensation reaction or by some other reaction with melamine, formaldehyde or the condensation products of melamine and formaldehyde, and dissociate as the resin dissolves in water to cause anions to be formed in the resin molecules and the cationic constituents of the compounds mentioned to dissociate off into the aqueous solution as a cation. Particularly preferred compounds having anionic groups are the sodium salt of amidosulfuric acid and sodium disulfite (sodium pyrosulfite, sodium metabisulfite).

The invention further provides a process for preparing etherified melamine resins in two stages: first melamine and formaldehyde are reacted under alkaline conditions in the presence of the compound having an anionic group, then the etherification alcohol, preferably methanol, and an acid are added to the resultant resin solution and the etherification is carried on to the desired degree of etherification.

The invention further provides a process wherein the compound having an anionic group is not added until the second stage, after the dissolution of the melamine in the aqueous formaldehyde solution, (i.e., after the onset of the methylolation reaction), or after the conclusion of the methylolation reaction. In either case, however, this compound should still be added during the alkaline condensation phase. The condensation is to be carried on until the level of unconverted compound having anionic group has dropped to less than 2% of the initial concentration. Thereafter, the reaction solution is acidified and the etherification carried out as a third stage.

As criterion for discontinuing the etherification, the compatibility of the reaction mixture with saturated sodium chloride solution can be used throughout all variants. The etherification should preferably be carried on until the compatibility of the reaction mixture with saturated sodium chloride solution is not less than 1:5.0. Compatibility is determined by intimately mixing one part by mass of the reaction mixture with x parts by mass of a saturated sodium chloride solution to provide a homogeneous mixture without visible opacity and increasing the mass of the sodium chloride solution added by gradual addition of this solution before the mixture obtained is again stirred and visually inspected. When there is still no opacity, further sodium chloride solution is added, and so on. A compatibility of 1:x is reported if this is the ratio of the mass of reaction mixture to sodium chloride solution at which permanent opacity first occurs.

The resins thus obtained can be used for preparing building materials, insulation material, fleece, web or nonwovens production, paper and textile finishing and for preparing foils and edgings by impregnation or coating of these substrates with the resin solutions. Mineral materials such as glass wool, rock wool, papers, including decorative papers, cardboard, textile structures such as woven fabric, bonded non-wovens, weft-knitted goods, felts, fleece, each made of fibres or threads comprising glass, natural fibers, fiber-forming natural and synthetic polymers such as cellulose, polyamides, polyesters, polyacrylonitrile or polyolefins being impregnated or coated with aqueous solutions containing these resins. The impregnated or coated materials are subsequently dried and, if appropriate, cut to the desired shape or length. The resins are especially suitable for paper coating and for bonding of glass fibre fleece.

All percentages in the examples hereinbelow as well as supra are mass fractions (ratio of the mass of the material in question to the mass of the mixture), unless otherwise stated. Concentrations in % are mass fractions of the dissolved material in the solution (mass of dissolved material divided by mass of solution).

EXAMPLE 1

73 g of deionized water and 499 g (3.6×1.8 mol) of 39% aqueous formaldehyde solution were charged to a 4 l three-neck flask equipped with stirrer, reflux condenser and internal thermometer, and heated to 85° C. 3.6 ml of 2.0 N (3.6×2.0 mmol) aqueous sodium hydroxide solution, 214 g (3.6×0.2 mol) of 40% aqueous sodium sulfamate solution were then added, which resulted in a pH of about 8.7, followed immediately by 454 g (3.6 mol) of melamine. The batch was heated to 95° C. in the course of 5 minutes, assisted by the heat of reaction, and stirred at 95° C. for a further 10 minutes. It was then cooled down to 58° C. The reaction mixture was admixed with 2307 g (3.6×20.0 mol) of methanol and 9.4 g (3.6×22.0 mmol) of 53% nitric acid, which resulted in a pH of about 6.3. The reaction mixture was heated to 50° C. and stirred at that temperature until the compatibility of the reaction mixture with saturated sodium chloride solution at 20° C. was 1:5.0 (mass ratio of reaction mixture to sodium chloride solution). The reaction was then stopped by adding 40 ml (3.6×22 mmol) of 2 N aqueous sodium hydroxide solution and cooling to 30° C. The methanol-containing reaction mixture was concentrated in a rotary evaporator at 100 hPa (100 mbar) at a bath temperature of about 60° C. and then adjusted with deionized water to a mass fraction of solids of 75% (sample weight 2 g, drying for 1 hour at 120° C. in a glass dish). The pH of the resin solution was adjusted to 10 by addition of dilute aqueous sodium hydroxide solution. This provided 972 g of resin having a solids mass fraction of 75%, a viscosity of 2020 mPa.s at 23° C. and an unlimited compatibility (miscibility) with deionized water. The level of free sodium sulfamate in the resin (measured by ion chromatography)

was about 0.09%. Consequently, less than 1% of the sodium sulfamate used was present in free form. The resin was stable upon storage for more than 2 months.

EXAMPLE 2

170 g of deionized water and 499 g (3.6×1.8 mol) of 39% aqueous formaldehyde solution were charged to a 4 l three-neck flask equipped with stirrer, reflux condenser and internal thermometer, and heated to 85° C. 3.6 ml of 2.0 N (3.6×2.0 mmol) aqueous sodium hydroxide solution, 68.4 g (3.6×0.1 mol) of sodium disulfite ($Na_2S_2O_5$) were then added, followed immediately by 454 g (3.6 mol) of melamine. The batch was heated to 95° C. in the course of 5 minutes, assisted by the heat of reaction, and stirred at 95° C. for a further 25 minutes. It was then cooled down to 58° C. The reaction mixture was admixed with 2307 g (3.6×20.0 mol) of methanol and 9.4 g (3.6×22.0 mmol) of 53% nitric acid, which resulted in a pH of about 6.7. The reaction mixture was heated to 50° C. and stirred at that temperature until the compatibility of the reaction mixture with saturated sodium chloride solution at 20° C. was 1:5.0 (mass ratio of reaction mixture to sodium chloride solution). The reaction was then stopped by adding 36 ml (3.6×20 mmol) of 2 N aqueous sodium hydroxide solution and cooling to 30° C. The methanol-containing reaction mixture was concentrated in a rotary evaporator at 100 hPa (100 mbar) at a bath temperature of about 60° C. and then adjusted with deionized water to a solids mass fraction of 75% (2 g, 1 hour at 120° C., glass dish). The pH of the resin solution was adjusted to 10 by addition of dilute aqueous sodium hydroxide solution. This provided 965 g of resin having a solids mass fraction of 75%, a viscosity of 2620 mPa.s at 23° C. and an unlimited compatibility (miscibility) with deionized water. The level of unconverted sodium disulfite, based on the amount of the melamine, was determined by titration with iodine/starch to be about 27.5 mmol/mol, i.e., only about 14% of the sodium disulfite used was present in the resin in free form.

EXAMPLE 3

Example 1 was repeated except that the aqueous 40% sodium sulfamate solution was not added until after the melamine had dissolved, i.e. after 10 minutes of stirring at 95° C. This provided 955 g of a resin solution having a solids mass fraction of 75%, an unlimited compatibility (miscibility) with deionized water, a viscosity of 2530 mPa.s at 23° C. and a mass fraction of free formaldehyde 0.14%.

Comparative Example 1

79 g of deionized water and 541 g (3.9×1.8 mol) of 39% aqueous formaldehyde solution were charged to a 4 l three-neck flask equipped with stirrer, reflux condenser and internal thermometer, and heated to 85° C. 3.9 ml of 2.0 N (3.9×2.0 mmol) aqueous sodium hydroxide solution were then added, which resulted in a pH of about 8.4, followed immediately by 492 g (3.9 mol) of melamine. The batch was heated to 95° C. in the course of 5 minutes, assisted by the heat of reaction, and stirred at 95° C. for a further 10 minutes. It was then cooled down to 58° C. The reaction mixture was admixed with 2499 g (3.9×20.0 mol) of methanol and 3.25 g (3.9×7.0 mmol) of 53% nitric acid, which resulted in a pH of about 6.1. The reaction mixture was heated to 50° C. and stirred at that temperature until the compatibility of the reaction mixture with saturated sodium chloride solution at 20° C. was 1:5.0 (mass ratio of reaction mixture to sodium chloride solution). The reaction was then stopped by adding 10 ml (3.9×5 mmol) of 2 N aqueous sodium hydroxide solution and cooling to 30° C. The methanol-containing reaction mixture was concentrated in a rotary evaporator at 100 hPa (100 mbar) at a bath temperature of about 60° C. and then adjusted with deionized water to a mass fraction of solids of 75% (2 g, 1 hour at 120° C., glass dish). The pH of the resin solution was adjusted to 10 by addition of dilute aqueous sodium hydroxide solution. This provided 1030 g of resin having a mass fraction of solids of 75%, a viscosity of 468 mPa.s at 23° C. and an unlimited miscibility (compatibility) with deionized water. However, the resin became opaque after just 17 days of storage at room temperature (20° C.).

Comparative Example 2

188 g of deionized water, 313 g (2.4×1.7 mol) of 39% aqueous formaldehyde solution, 1.7 ml of 2.0 N (2.4×1.4 mmol) aqueous sodium hydroxide solution, 107 g (2.4×0.15 mol) of 40% sodium sulfamate solution and 303 g (2.4 mol) of melamine were charged in succession to a 1 l three-neck flask equipped with stirrer, reflux condenser and internal thermometer. The reaction mixture was heated to 94° C. and stirred at 94° C. for about 5 minutes until the batch became clear. This was followed by cooling to 80° C. and condensation to a compatibility of the reaction mixture with saturated sodium chloride solution at 20° C. of 1:4.0 (mass ratio of reaction mixture to sodium chloride solution). The reaction was discontinued by cooling to 20° C. The pH of the mixture was adjusted to about 9.5 by addition of dilute aqueous sodium hydroxide solution. The resin had a solids mass fraction of 51% and an unlimited miscibility (compatibility) with deionized water. However, after just 16 days of storage at 20° C. the water compatibility decreased to below 1:15 (mass ratio of resin to deionized water). After 5.5 weeks, the resin became opaque.

APPLICATIONS EXAMPLES

Dry Breaking Resistance of Impregnated Glass Fleeces

The resin of Example 1 was tested against a commercially available methyl-etherified melamine resin having an F/M ratio of 2.3 for amounts of substrate of formaldehyde units to melamine units. 65 parts by mass of deionized water and 0.35 part by mass of 25% phosphoric acid were added per every 10 parts by mass of 75% resin. Each composition was used to dip impregnate a strip (16×24 cm) of a glass filter paper (from Schleicher & Schüll, type GF 8, about 75 g/m$^2$). The moist impregnate was dragged off on both sides by means of glass rods and dried at 180° C. for 3 minutes. Thereafter, the residual moisture content was only about 0.5%. The dry breaking resistance, determined on a sample strip 1.5 cm in width and 15 cm in length, in the longitudinal direction was 32.3 N for the fleece impregnated with resin of Example 1 and 28.4 N for that impregnated with the commercially available resin.

Formaldehyde Cleavage

To determine the amount of formaldehyde released in the course of curing, the resin of Example 1 was tested against the resin of Comparative Example 1 and against the above-mentioned commercially available methyl-etherified melamine resin. To this end, 20 g of each resin (75% in strength) were admixed with 55 g of deionized water and 2.25 g of 10% phosphoric acid. Two strips (4×25 cm) of glass filter paper (from Schleicher & Schüll, type GF 8, about 75 g/m$^2$) each were impregnated with about 1.5 g of each impregnating liquor in a uniform manner, and the formaldehyde cleavage in the course of 35 minutes in a tube at 170° C. under an air stream of 60 l/h was measured.

The following results were found:

| | |
|---|---|
| With resin of Example 1: | 1.1% based on the mass of solid resin employed |
| With resin of Comparative Example 1: | 1.5% based on the mass of solid resin employed |
| With commercially available resin: | 2.4% based on the mass of solid resin employed |

Formaldehyde Cleavage Under Hydrolytic Influence, Exemplified by Impregnated Glass Filter Paper (Fleece/Textile Application)

To determine the formaldehyde generated in an end product, the resin of Example 1 was tested against the abovementioned commercially available methyl-etherified melamine resin. To this end, 10 g of each resin (75% strength) were admixed with 65 g of deionized water and 0.35 g of 25% phosphoric acid and glass filter paper (from Schleicher & Schüll, type GF 8, about 75 g/m$^2$) was impregnated with this liquor so that the impregnates had a mass fraction of resin of about 20%. 24 strips of the impregnate 2.5 cm×5.0 cm=0.030 m$^2$ in size were suspended above 50 ml of deionized water previously introduced into 500 ml polyethylene bottles, and left at 50° C. for 6, 16 and 24 hours. The formaldehyde content of the contaminated water was determined after the exposure times by reaction of the formaldehyde with acetylacetone to form diacetyldihydrolutidine (DDL) and spectrophotometry at a wavelength of 412 nm (DDL peak). The following values were found for the $m_F/m_H$ ratio (in %) of the mass $m_F$ of the evolved formaldehyde to the mass $m_H$ of solid resin in the sample:

TABLE

| | Mass of evolved formaldehyde, based on mass of solid resin, in % | |
|---|---|---|
| Exposure at 50° C. in hours | Resin of Example 1 | Commercially available methyl-etherified melamine resin |
| 6 | 0.3 | 0.4 |
| 16 | 0.7 | 1.0 |
| 24 | 1.2 | 1.6 |

What is claimed is:

1. Water-dilutable etherified melamine-formaldehyde resins obtained by reacting melamine, formaldehyde, a compound having anionic groups and an etherification alcohol in a ratio of amounts of substance of melamine:formaldehyde:compound having anionic group:etherification alcohol of 1:(1.7 to 7.0):(0.01 to 0.4):(10 to 30) in the reaction mixture.

2. Water-dilutable etherified melamine-formaldehyde resins as claimed in claim 1, wherein said compounds having anionic groups are selected from the group consisting of salts of amidosulfuric acid H$_2$N—SO$_2$—OH, sulfurous acid H$_2$SO$_3$ and disulfurous acid H$_2$S$_2$O$_5$ with alkali metals and ammonium.

3. Water-dilutable etherified melamine-formaldehyde resins as claimed in claim 1, wherein up to 10% of the melamine is replaced by one or more compounds selected from the group consisting of acetoguanamine, benzoguanamine, caprinoguanamine and the cyclic ureas 2-imidazolidinone, 2-oxo-hexahydropyrimidine and glycoluril.

4. Water-dilutable etherified melamine-formaldehyde resins as claimed in claim 1, wherein up to 8% of the melamine is replaced by one or more compounds selected from the group consisting of urea and thiourea.

5. Water-dilutable etherified melamine-formaldehyde resins as claimed in claim 1, wherein said etherification alcohol is selected from the group consisting of linear and branched aliphatic alcohols having 1 to 6 carbon atoms.

6. Water-dilutable etherified melamine-formaldehyde resins as claimed in claim 1, wherein said etherification alcohol is methanol.

7. Water-dilutable etherified melamine-formaldehyde resins as claimed in claim 1, wherein said compound having anionic groups is selected from the group consisting of the sodium salt of amidosulfuric acid and sodium disulfite.

8. A process for preparing water-dilutable etherified melamine-formaldehyde resins, wherein in the first stage, melamine and formaldehyde are reacted under alkaline conditions in the presence of a compound having an anionic group, and in the second stage, the etherification alcohol and an acid are added to the resultant resin solution and the etherification is effected.

9. A process for preparing water-dilutable etherified melamine-formaldehyde resins, wherein in the first stage, melamine and formaldehyde are reacted under alkaline conditions until the melamine dissolves, and then a compound having an anionic group is added which in the second stage is reacted with the reaction product of the first stage, and in the third stage, the etherification alcohol and an acid are added to the resultant resin solution and the etherification is effected.

10. A process as claimed in claim 8 or 9, wherein the etherification is carried on until the compatibility of said resin solution with saturated sodium chloride solution is not less than 1:5.0.

11. A method of use of the water-dilutable etherified melamine-formaldehyde resins of claim 1 for preparing impregnates, which comprises impregnating or coating substrates selected from the group consisting of mineral materials, papers and cardboard and textile structures composed of threads or fibres composed of glass or natural or synthetic polymers with aqueous solutions of said etherified melamine-formaldehyde resins, and drying the substrates thus impregnated or coated.

12. A method of use as claimed in claim 11, where glass fibre fleece is used as a substrate.

13. A method of use as claimed in claim 11, where paper is impregnated or coated with aqueous solutions of the said etherified melamine-formaldehyde resins.

* * * * *